Figure 1:
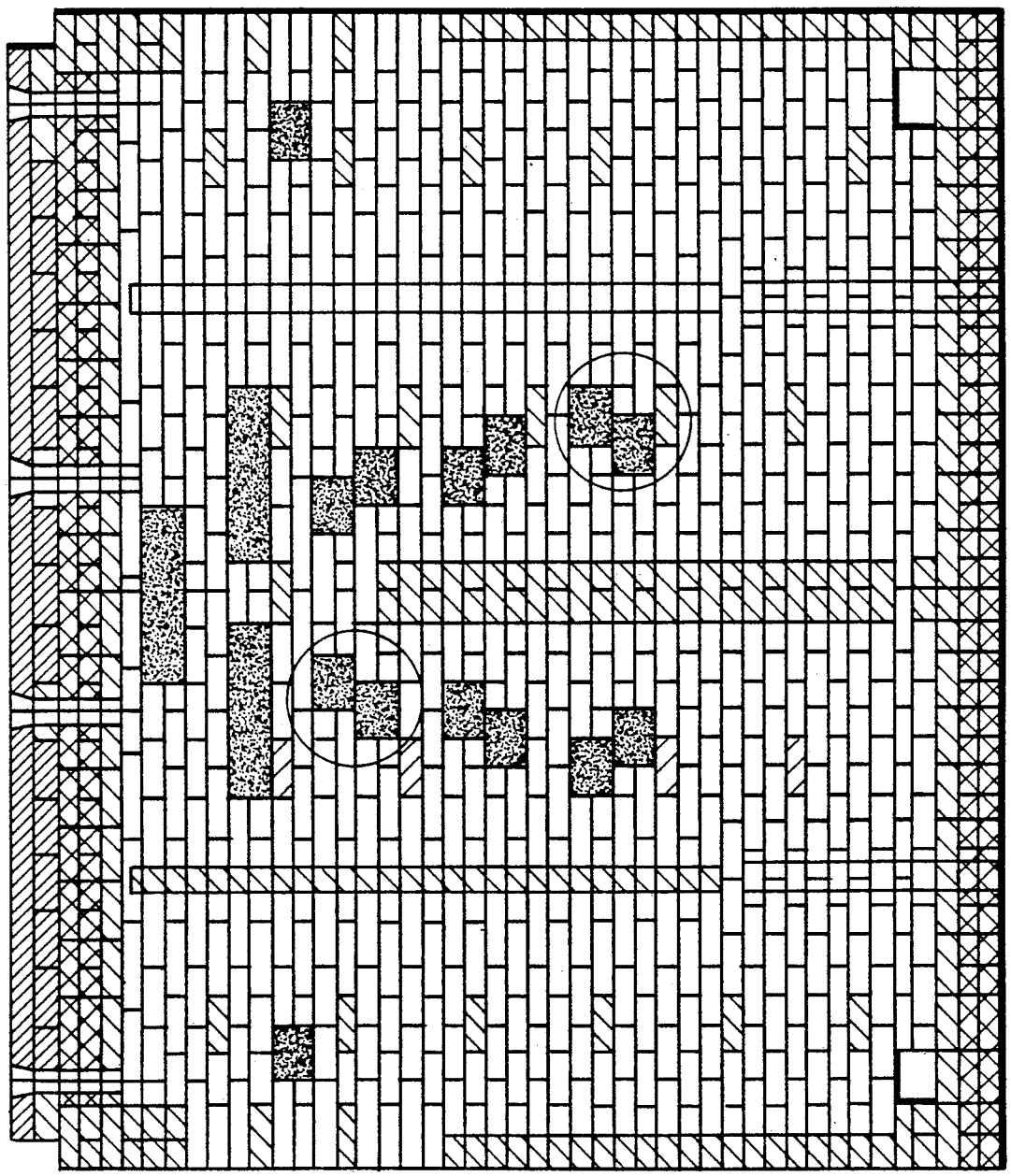

United States Patent [19]

Albon et al.

[11] Patent Number: 5,030,595
[45] Date of Patent: Jul. 9, 1991

[54] CARBON BAKE REFRACTORIES

[75] Inventors: Derek Albon; Mary A. Windfeld; Ronald W. Smith, all of Abbotsford, Canada

[73] Assignee: Clayburn Industries, Ltd., Abbotsford, Canada

[21] Appl. No.: 430,113

[22] Filed: Nov. 1, 1989

[30] Foreign Application Priority Data

Jul. 18, 1989 [CA] Canada ................................. 605937

[51] Int. Cl.$^5$ ...................... C04B 35/52; C04B 35/56
[52] U.S. Cl. ...................................... 501/89; 501/88; 501/100
[58] Field of Search ............................ 501/89, 90, 100

[56] References Cited

U.S. PATENT DOCUMENTS

| 2,300,683 | 3/1941 | McClaskey | 501/89 |
|---|---|---|---|
| 3,753,744 | 8/1973 | Komaru et al. | 501/100 |
| 4,093,470 | 6/1978 | Cherry | 501/100 |
| 4,210,264 | 7/1980 | Kondo | 222/591 |
| 4,298,391 | 11/1981 | Hayase et al. | 501/89 |
| 4,327,185 | 4/1982 | Bonsall | 501/100 |
| 4,544,641 | 10/1985 | Dumas et al. | 501/90 |
| 4,751,204 | 6/1982 | Kyoden et al. | 501/89 |

FOREIGN PATENT DOCUMENTS

| 677677 | 1/1964 | Canada | 501/90 |
|---|---|---|---|
| 0140766 | 11/1980 | Japan | 501/89 |
| 0217672 | 12/1984 | Japan | 501/90 |
| 0210325 | 1/1988 | New Zealand | 501/89 |

OTHER PUBLICATIONS

Dialog Abstracts, JP 56140079 2/11/81, "Castable Refractory Composn. for Vibration Moulding . . . Aggregate" Nippon Steel.
"Introduction to the Principles of Ceramic Processing", James Reed (1988) pp. 152-168.
Introduction to Ceramics, W. D. Kingert et al., pp. 540-543, John Wiley and Sons (1976).

Primary Examiner—William R. Dixon, Jr.
Assistant Examiner—Paul Marcantoni
Attorney, Agent, or Firm—Jones, Tullar & Cooper

[57] ABSTRACT

The present invention relates to an unfired refractory brick for use in reducing conditions at temperatures above 1800° F. The brick comprises a matrix of alumino-silicate clays, alumino-silicate-aggregates and high alumina aggregates. It also has 2 to 20% by weight of finally ground silicon carbide and 2 to 20% by weight of fine carbon particles distributed throughout the matrix. The matrix also includes a water soluble ammonium lignin sulphonate as a chemical binding agent. The brick of the present invention finds particular use in a furnace for kiln baking anodes used in the electrolytic production of aluminum metal.

8 Claims, 1 Drawing Sheet

CARBON BAKE REFRACTORIES

The present invention deals in general with refractory bricks and more particularly with a refractory brick for use at temperatures above 1800° F. in reducing conditions such as in a furnace for kiln baking the carbon anodes used in the electrolytic production of aluminum metal.

Since the oil crisis in the early 1970's, there has been a gradual shift in the location of world production of aluminum metal as nations with high energy costs have found they can no longer compete in global markets. As a result, many older smelters have closed down and the more economical balance capacity has expanded, and continues to do so, to meet world demand.

In the aluminum smelting industry, in addition to the pot lines, plant designs include facilities to manufacture and "kiln-bake" the carbon anodes used in the electrolytic process. The kiln baking is accomplished in intricately designed furnaces lined with refractory brick capable of withstanding flue temperatures up to 2550° F. The furnaces are massive structures constructed above or below ground covering areas 200'×400'. In design, the furnaces are divided up into several hundred baking pits each approximately 15' long ×3' wide ×12' deep into which "green" carbon anode blocks are closely packed and completely covered with petroleum coke dust prior to baking. Heating is indirect from the combustion flue systems which surround and form each pit. Heat is transferred directly from the combustion flue systems through the refractory flue walls and into the pits where the anodes are packed for baking. The refractory flue walls are usually $4\frac{1}{2}$" in thickness and run the entire length and width of the pits with the flues themselves 9"-12" in width.

In operation carbon bake furnaces typically follow a twelve (12) day cycle with the actual burn phase occupying six (6) of the twelve (12) days.

During the remaining six (6) days, the burned anodes are removed from the pits, the flue walls are examined and repaired if necessary. The pits are then refilled with green anodes and the entire assemblage buried in petroleum coke dust ready for the next burn. The anodes themselves are usually calcined to about 2250° F. however since this involves an indirect heat transfer the temperature within the flue system can range up to 2550° F.

Historically super duty and high alumina quality brick have been used for the application and have given a reasonable account of themselves in service. However, campaign lives have always been short, sometimes only 18 months.

Research carried out over the years concluded that the short service life was due to the intrusion into the refractory lining of sodium and fluorine agents from the carbon anodes being baked. As a result hot load bearing strengths gradually decreased and baking pit flue structures eventually failed due to pyro plastic flow of the linings. The research suggested high purity raw materials, low porosities and superior refractoriness-under-load values as properties of prime importance in the make-up of refractories for the application.

In spite of these findings and recommendations, the service life in many furnaces still remains in the 18-24 month range.

In order to increase the service life of the refractory bricks in the furnaces, it was necessary to investigate the fundamental reactions between the existing carbon bake refractories and the degrading agencies present in carbon bake lo furnaces. A model refractory brick capable of withstanding the degradation associated with these agencies could then be designed.

The present invention has significantly improved resistance to the problems associated with the use of refractories at temperatures in excess of 1800° F. in reducing conditions and particularly in conditions such as those found in furnaces for kiln baking carbon anodes.

Broadly, the present invention provides an unfired refractory brick for use in reducing conditions at temperatures above 1800° F. which comprises a matrix of alumino-silicate clays, alumino-silicate aggregates and alumina aggregates. Distributed throughout this matrix are silicon carbide and carbon particles; the silicon carbide being present in the range of 2% to 20% by weight and the carbon particles, being present preferably as calcined petroleum coke, in the range of 2% to 20% by weight. In the matrix, the alumina content should not be more than 60% by weight and preferably less than 50% since penetration of the cryolitic agencies into the brick matrix in service though controlled in the present invention by carbon is also a function of the chemistry of the alumino-silicate matrix and, above 60% alumina, reactivity with agencies diminishes thereby reducing the partial sealing mechanism of the reaction products.

In a preferred embodiment manufacture of the brick is facilitated by the addition of a water soluble ammonium lignin sulphonate which also acts as a chemical binder upon drying. Other chemical deflocculating additives either singly or in mixtures may be used—carboxymethyl cellulose, aluminum sulfate, activated sodium bentonite, sodium starches, sodium phosphates, etc., however the preferred additive is ammonium lignin sulphonate.

Silicon carbide is added to the refractory to provide a novel carbon replenishment mechanism to replace the carbon lost due to oxidizing conditions which exist in the flue walls during the early stages of heat up and during the cool down cycles in the carbon baking process.

The refractory brick is shipped and installed in an unfired condition. This procedure is followed to maintain and augment the amount of carbon in the refractory since normal kiln firing of bricks during manufacture occurs generally in oxidizing conditions and thus would cause unnecessary losses in carbon content.

Refractory bricks comprising alumina, carbon and silicon carbide are known in the art, however none has been designed to utilize the carbon replenishment concept specific to applications in reducing conditions and at temperatures above 1800° F. in order to prevent short service lives and the resultant increased costs.

U.S. Pat. No. 2,300,683 to McClaskey defines a firebrick which includes about 80-90% crude clay plus alumina, iron, graphite and carborundum in equal proportions plus either magnesite or chrome, all of which are held together in an unfired condition prior to use by a mixture of strong salt brine and lignum liquors.

Use of this firebrick in carbon baking furnaces would be particularly unsuitable because of the high and uncontrollable dry to fired shrinkage and the certainty of warpage with such a high crude clay matrix when subjected to the rapid firing cycles in the carbon baking process. Also the degrading elements in a carbon baking furnace are derived wholly from dissociated cryolite i.e., sodium, aluminum and fluorine, with sodium being the most aggressive of the three. Thus the salt brine/lignum bond of this patent would be highly counterproductive since the sodium chloride (brine) would enhance susceptibility to attach by vapour phase sodium. Also the salt brine/lignum mix is added for strength considerations only. The preferred lignin of the present invention, ammonium lignin sulphonate, fulfils three functions of equal importance. Firstly it fulfils an electrolytic deflocculating function to improve rheological and extrusion properties; secondly it improves dry strength; and thirdly it provides a carbon coating on the surface of the brick after burning under reducing conditions. Finally, graphite only is specified for use in the McClaskey patent and all graphites contain between 5 to 60% by weight non-refractory ash impurities which would be detrimental to a refractory used under reducing conditions at elevated temperatures and exposed to cryolitic agencies.

U.S. Pat. Nos. 4,108,675 and 3,753,744 to Tomita et al. and Komaru et al., respectively, describe refractories which may contain alumina, naturally occurring graphite (unsuitable for the present invention) and silicon carbide. The Tomita patent may also contain a tar or pitch binder. In both these patents, however, the refractory bricks are kiln burned prior to use in a furnace and are geared for use in oxidizing conditions. The Komaru brick is kiln burned under reducing conditions during manufacture which would preserve the carbon in the refractory, but it is designed for use in oxidizing conditions.

Though both patents include silicon carbide, inclusion is clearly for purposes of improved strength, increased thermal conductivity and enhanced resistance to oxidation. Neither patent features the carbon replenishment mechanism of the present invention. Furthermore the replenishment mechanism is inoperable under oxidizing conditions.

Finally, the alumina content of Komaru is higher (60–80%) than that used in the present invention.

U.S. Pat. No. 4,210,264 to Kando also teaches refractories having a similar composition but for use particularly in oxidizing environments and the silicon carbide is added in place of the carbon because of a lower susceptibility to oxidation. Again the patent does not feature the carbon replenishment mechanism and indeed could not because of use in an oxidizing atmosphere.

The U.S. Pat. No. 4,093,470 to Cherry specifically describes an unshapen unfired refractory containing over 50% alumina in contrast to the present invention which is in rick form with an alumina content preferably less than 50%.

The carbon added to the refractory is in the form of naturally occurring graphites which are undesirable due to the impurities that are introduced into the system from the ash. Finally the silicon carbide is added to promote higher thermal conductivity for improved sintering considerations with no reference to any carbon replenishment mechanism.

U.S. Pat. No. 4,327,185 to Bonsall also describes refractories composed of high alumina aggregates, clays, carbon and silicon carbide. Again, the inclusion of silicon carbide is for slag resistance purposes only, not for carbon replenishment as in the present invention.

The chemical binder used in the Bonsall patent is specifically a phenol formaldehyde binder which merely increases a dry strength of the brick. The binder used in the present invention not only increases strength of the brick but also aids in the manufacture of the brick and improves slag resistance during use in reducing conditions. In order to improve on the refractory bricks for use in reducing conditions, and preferably in carbon bake furnaces, research was carried out to investigate the fundamental reactions between existing carbon bake refractories and the degrading agencies present in those furnaces.

The initial results of the investigation confirmed previously reported data by other researchers identifying cryolitic agencies as the major degrading presence in carbon bake service. Later results however were quite unexpected and showed that some of the generally held beliefs concerning the mode of failure and the important property requirements were only partially correct.

The research concluded:
1) that the movement of dissociated cryolite agencies, such as sodium, alumina and fluorine, from the carbon anodes to the refractory structure was by vapour phase transport alone;
2) that, due to the negative pressures maintained in the baking pits, intrusion of the vapours into the refractory lining en route to the flues for evacuation was unavoidable and inevitable regardless of the porosity of the refractory brick in the lining;
3) that the rate of intrusion was a function of chemistry not porosity, i.e., porosity was not of major significance to penetration;
4) that the preferred matrix of the refractory should contain 30 to 60% alumina ($Al_2O_3$) and 40 to 65% silica ($SiO_2$);
5) that the reaction of the vapour phase elements from the dissociated cryolite with the refractory matrix produced a liquid phase product which moved into the matrix by capillarity and negative pressure forces;
6) that the normal mode of failure of carbon bake refractories was not, as previously reported, the loss of hot load bearing capability but rather the formation of mechanical and thermal stress cracks during service with subsequent loss of structural stability at elevated temperatures; and
7) that the build-up of stress during service leading to the cracking phenomena and the subsequent loss of structural stability was due to the differences in the chemical, physical and thermal properties of the refractory zone altered by the intrusion and the unchanged refractory matrix. The stress cracks developed under the normal operational thermal cycling of the furnace.

On the basis of these conclusions a carbon bake brick has been developed which is equivalent in all significant respects to existing carbon bake bricks but includes fine carbon particles evenly distributed throughout the matrix. It was found in subsequent development work that the degradation of the refractory matrix normally associated with sodium/alumina/fluorine reaction products could be neutralized by the presence of fine carbon particles throughout the refractory matrix. Also, the hot load bearing capacity of the refractory matrix could be rendered unaffected by the presence of cryolitic reaction products when fine carbon particles were evenly disseminated throughout the matrix. In fact the hot load bearing capacity of refractory bodies containing fine carbon particles was found to be unaffected even when the sodium was increased tenfold in the matrix.

Finally it was found that the presence of the fine carbon particles in the refractory matrix minimized the stresses involved by increasing the thermal conductivity, by reducing the reversible thermal expansion, and above all by neutralizing the reaction between the intrusive vapours and the refractory matrix.

Both the technology involved and the benefits accruing from carbon additions to refractory materials are well known and documented, such as slag resistance and thermal conductivity. However, equally well known are the problems associated with preventing carbon losses through oxidation. In this regard, although the carbon anode baking process is carried out under reducing conditions, strongly oxidizing conditions can and do exist during certain phases of the burning cycle which result in a gradual loss of carbon particulate from the body matrix.

In the present invention, this carbon loss from the body matrix is compensated by a novel carbon replenishment mechanism involving silicon carbide. The mechanism is as follows:

During the anode baking cycle a reducing atmosphere, high in carbon monoxide exists in the pits bounded by the refractory flue walls, while an oxidizing atmosphere exists in the flue system. All the gases from the baking operation pass, due to negative pressures involved, through the refractory flue walls and into the combustion/flue system for evacuation. At temperatures above 1800° F. under reducing conditions in the presence of carbon monoxide, silicon carbide begins to dissociate in accordance with the following equation:

$$SiC + 2CO \longrightarrow SiO_2 + 2C$$

Thus, by adding silicon carbide the very conditions found during certain phases of the normal carbon baking operation result in a gradual dissociation of the silicon carbide and deposition of carbon within the matrix of the refractory flue walls during every thermal cycle of the anode baking furnace.

Another feature of the present invention concerns the chemical bonding agency. Since normal kiln firing during manufacture would burn out the carbon in the refractory matrix, the present product has been designed to be sold either in a dried state or in a plastic state utilizing a chemical bonding agency. A water soluble ammonium lignin sulphonate has been found to be a satisfactory chemical bonding agent for this purpose fulfilling three functions:

it improves the plastic extrudability of the clay matrix by electrolytic action;

it migrates to the surface of the refractory during drying to provide a case hardening effect and thus increases the dry strength of the refractory; and when fired under reducing conditions, as in a carbon baking furnace, the lignin forms a carbon layer covering the entire surface of the refractory, thus providing additional slag resistance against the degrading agencies in the system.

The carbon and silicon carbide used in the present invention are preferably present as very fine particles so that a large surface area of these constituents is available for reaction. Preferably, the carbon is present as finely ground petroleum coke or as any other finely ground, high purity carbon source. It is preferably to have the silicon carbide distributed throughout the matrix in the form of small particles so that the carbon formed by the replenishment mechanism will be evenly distributed. It has been determined that the capability of improving slag resistance and the service life of the refractory bricks is dependent not only on the percentage of carbon present in the matrix but, and likely more importantly, on the grain size of the carbon particles involved. By the carbon replenishment mechanism, molecular carbon with the highest possible surface area is deposited within the pore structure to impart a slag resistance which is beyond the actual percentage of carbon involved.

The specifications for the finely divided carbon and in particular the preferred calcined petroleum coke and the silicon carbide are as follows, it being understood that the specifications are not of a limiting nature:

| CALCINED PETROLEUM COKE | |
|---|---|
| CHEMICAL ANALYSIS - TYPICAL | |
| Fixed Carbon | 97.0–99.0% |
| Ash | 0.1–1.0% |
| Sulphur | 0.5–1.0% |
| Moisture | 0.1–1.0% |
| Trace Elements | Iron, Calcium, Sodium, Silicon, Vanadium |
| SCREEN ANALYSIS | |
| −80 mesh | 100% |
| SILICON CARBIDE | |
| CHEMICAL ANALYSIS - TYPICAL | |
| Silicon Carbide | 92–99% |
| Free Silica and Silicon | 1–4% |
| Iron | 0.1–2.00% |
| Alumina | 0.1–0.30% |
| SCREEN ANALYSIS | |
| Grit Size | 800 F. |

EXAMPLE I

A refractory body was prepared having the following composition:

| Mullite Aggregate | 54.4% by weight |
|---|---|
| High Alumina Aggregate | 8.0% |
| Refractory Bonding Clay | 30.0% |
| Silicon Carbide | 5.0% |
| Powdered Carbon | 2.0% |
| Ammonium Lignin Sulphonate | 0.6% |

Full size trial bricks were manufactured by the stiff mud extrusion process. After drying, test bricks ("A") were burned under highly reducing conditions to a temperature high enough to break down the clay molecules and to release the water of crystallization, i.e., above 1000° F., yet not high enough to trigger the silicon carbide/carbon replenishment mechanism, i.e., below 1800° F. Other duplicate trial samples ("B") were then heated under carbon bake service conditions to 2400° F. and held for a 90 day test period.

Specimens from both the preliminary burns were then subjected to X-ray analysis to determine, quantitatively, the percentage silicon carbide present in the "A" and "B" specimens. By difference the percentage of silicon carbide dissociation that had taken place in the "B" specimens i.e., those burned under carbon bake conditions for 90 days, could then be calculated.

The X-ray diffraction results are shown in Table I.

TABLE I

| | X-RAY DIFFRACTION | |
|---|---|---|
| | "A" SPECIMENS BURNED UNDER REDUCING CONDITIONS 1800° F. | "B" SPECIMENS BURNED UNDER CARBON BAKE CONDITIONS 2400° F. |
| SiC (%) in the Matrix | 5.0% | 2.60% |
| Carbon (%) Available by Replenishment Mechanism from the SiC in Matrix | 1.5% | 0.78% |
| % Carbon That Should Have Been Liberated By Dissociation of the 2.4% SiC(5.0–2.6) and Deposited in the Matrix | — | 0.72% |

A review of the X-ray results in Table I indicates that some 2.6% silicon carbide remained in the matrix of the trial brick "B" after the 90 day test period versus 5% in the "A" specimens. In other words, 5.0%−2.6%=2.4% of the silicon carbide had dissociated during the 90 day test period and therefore 0.72% molecular carbon should have been deposited in the matrix by the replenishment mechanism.

To check the validity of this assertion, other "A" and "B" test specimens from both the preliminary burns were refired to 1600° F. in a strongly oxidizing atmosphere and loss on ignition values determined, i.e., the carbon contents.

The results are listed in Table II.

TABLE II

| SPECIMENS "A" AND "B" % LOSS ON IGNITION VALUES DETERMINED UNDER OXIDIZING CONDITION | | |
|---|---|---|
| | "A" SPECIMENS | "B" SPECIMENS |
| Loss on Ignition, % 1600° F. for 24 Hours | 2.55 | 3.39 |

The make-up of the loss on ignition values in Table II were then calculated for each specimen type. The results are shown in Table III.

TABLE III

| MAKE-UP LOSS ON INGITION VALUES IN "A" AND "B" SPECIMENS | | |
|---|---|---|
| | "A" SPECIMENS | "B" SPECIMENS |
| % Carbon Added In Original Body Composition | 2.00 | 2.00 |
| % Carbon in Ammonium Lignin Sulphonate | 0.41 | 0.41 |
| % Carbon in Bond Clay | 0.14 | 0.14 |
| % Carbon by Replenishment Mechanism | NIL | 0.84 |
| Total: | 2.55 | 3.39 |

The above results show that the carbon gain due to the silicon carbide dissociation was 0.84%, this compares with a 0.72% gain indicated by X-ray diffraction. These results are considered as close as can be expected from a practical standpoint.

EXAMPLE II

As another example, bricks of a similar composition detailed below and designated Bricks "C" were tested in an operation carbon bake furnace.

| Mullite Aggregate | 55% |
|---|---|
| Refractory Bonding Clay | 30% |
| Silicon Carbide | 10% |
| Powdered Carbon | 4.4% |
| Ammonium Lignin Sulphonate | 0.6% |

The bricks were placed in various locations within the walls of a carbon bake furnace surrounded by standard bricks which are generally used in this situation. The various locations of the trial brick are shown in FIG. I. FIG. I is a front elevational view of a carbon bake furnace wall partially constructed from refractory bricks of the present invention. The furnace was then put into operation and after a period of six (6) months the bricks of the present invention were removed and analyzed for carbon content by re-burning to 1600° F. in a strongly oxidizing atmosphere. Other identical full size sample bricks, designated bricks "D", previously burned under highly reducing conditions to a temperature high enough to break down the clay molecules and to release the water of crystallization i.e., above 1000° F. yet not high enough to trigger the silicon carbide/carbon replenishment mechanism i.e., below 1800° F. were included in the re-burning to 1600° F. for comparative purposes. After cooling, loss on ignition values were determined and are detailed in Table IV.

TABLE IV

| LOSS ON IGNITION VALUES DETERMINED UNDER OXIDIZING CONDITIONS | | |
|---|---|---|
| | SIX MONTHS IN SERVICE | |
| | "C" SPECIMENS | "D" SPECIMENS |
| Loss on Ignition, % 1700° F. for 24 Hours | 6.66% | 4.95% |

As before, the make-up of the loss on ignition values in Table IV were calculated for each specimen type. The results are shown in Table V.

TABLE V

| MAKE-UP OF LOSS ON IGNITION VALUES IN "C" AND "D" SPECIMENS | | |
|---|---|---|
| | "C" SPECIMENS | "D" SPECIMENS |
| % Carbon in Original Body Composition | 4.40 | 4.40 |
| % Carbon in Ammonium Lignin Sulphonate | 0.41 | 0.41 |
| % Carbon in Bond Clay | 0.14 | 0.14 |
| % Carbon by Replenishment Mechanism | 1.71 | — |
| | 6.66 | 4.95 |

The above results show the carbon gain due to the replenishment mechanism to be a minimum 1.71. This could be higher depending upon the carbon loss due to concurrent oxidation in service; i.e., a portion of the 4.40% carbon in the body composition could have been lost due to an excursion into oxidizing conditions in service.

Of particular interest in these six months in service specimens was the depth of penetration of the degrading agencies. This could readily be determined visually and showed the superiority of the new brick of the present invention over the existing brick. The penetration depth in the new brick was found to be ¼" to ⅜" while in the existing brick it was found to be 2¼" to 2½". It can be seen that the brick of the present invention drastically reduced the degradation effects of the cryolitic agencies.

The following table shows examples of compositions of bricks made according to the teachings of the present invention.

TABLE VI
EXAMPLES OF COMPOSITIONS

| | PREFERRED % | RANGE % |
|---|---|---|
| EXAMPLE 1 | | |
| Calcined Kaolinitic Aggregate | 62.4 | 50–85 |
| Refractory Bonding Clays | 30.0 | 15–40 |
| Silicon Carbide | 5.0 | 2–20 |
| Powdered Carbon | 2.0 | 2–20 |
| Chemical Binder | 0.6 | 0.5–2.0 |
| EXAMPLE 2 | | |
| Calcined Kaolinitic Aggregate | 32.4 | 25–55 |
| High Alumina Aggregate | 16.0 | 5–25 |
| Refractory Bonding Clays | 25.0 | 20–45 |
| Silicon Carbide | 15.0 | 2–20 |
| Powdered Carbon | 11.0 | 2–20 |
| Chemical Binder | 0.6 | 0.5–2.0 |
| EXAMPLE 3 | | |
| Mullite Aggregate | 55.0 | 40–70 |
| Refractory Bonding Clays | 30.0 | 15–40 |
| Silicon Carbide | 10.0 | 2–20 |
| Powdered Carbon | 4.4 | 2–20 |
| Chemical Binder | 0.6 | 0.5–2.0 |
| EXAMPLE 4 | | |
| Mullite Aggregate | 54.4 | 40–70 |
| High Alumina Aggregate | 8.0 | 5–25 |
| Refractory Bonding Clays | 30.0 | 15–40 |
| Silicon Carbide | 5.0 | 2–20 |
| Powdered Carbon | 2.0 | 2–20 |
| Chemical Binder | 0.6 | 0.5–2.0 |

In Examples 2 and 4, the high alumina fraction can be aggregates such as bauxite aggregate, calcined alumina, Kyanite, Andalusite or Sillimanite.

The embodiments of the invention in which an exclusive property or privilege is claimed are defined as follows:

1. An unfired refractory brick for use in reducing conditions at temperatures above 1800° F. in carbon baking furnace applications comprising a matrix of alumino-silicate clays, alumina-silicate aggregates and alumina aggregates and having 2 to 20% by weight finely ground silicon carbide and 2 to 20% by weight fine carbon particles distributed throughout said matrix; said matrix comprising less than 50% by weight alumina and said matrix further comprising a water soluble ammonium lignin sulphonate as a chemical binding agent.

2. The brick as in claim 1, wherein said matrix comprises 30% to less than 50% alumina and 40 to 65% silica, by weight.

3. The brick as in claim 1, wherein said fine carbon particles comprise finely ground petroleum coke.

4. The brick as in claim 1, wherein the amount of carbon particles is 2 to 5% by weight.

5. The brick as in claim 1 wherein the amount of fine silicon carbide is 5 to 10% by weight.

6. A lining for a furnace for kiln baking carbon anodes used in the electrolytic production of aluminum comprising refractory brick as defined in claim 1.

7. A refractory brick for use in a reducing atmosphere at temperatures above 1800° F. as a lining of a furnace for kiln baking carbon anodes comprising a matrix of alumino-silicate clays, alumina-silicate aggregates and alumina aggregates and having b 2 to 20% by weight fine carbon particles distributed throughout said matrix; said matrix comprising less than 50% by weight alumina and said matrix further comprising a water soluble ammonium lignin sulphonate as a chemical binding agent.

8. A refractory brick according to claim 1, wherein the chemical binder migrates to the surface of the brick during drying and creates a surface layer of carbon after burning in a reducing atmosphere; said carbon layer providing a non-wetting surface layer on the brick highly resistant to cryolitic slags.

* * * * *